United States Patent
Von Roden et al.

(10) Patent No.: US 10,513,238 B2
(45) Date of Patent: Dec. 24, 2019

(54) APPARATUS FOR FASTENING A GAS GENERATOR IN AN OSCILLATORY MANNER AS A VIBRATION DAMPING MASS INSIDE AN AIRBAG MODULE

(71) Applicant: TRW Automotive Safety Systems GmbH, Aschaffenburg (DE)

(72) Inventors: Constantin Von Roden, Karlstein (DE); Gregor Eck, Kirchzell (DE); Holger Oechel, Hanau (DE)

(73) Assignee: TRW AUTOMOTIVE SAFETY SYSTEMS GMBH, Aschaffenburg (DE)

( * ) Notice: Subject to any disclaimer, the term of this patent is extended or adjusted under 35 U.S.C. 154(b) by 227 days.

(21) Appl. No.: 15/520,459

(22) PCT Filed: Oct. 9, 2015

(86) PCT No.: PCT/EP2015/001989
§ 371 (c)(1),
(2) Date: Apr. 20, 2017

(87) PCT Pub. No.: WO2016/062377
PCT Pub. Date: Apr. 28, 2016

(65) Prior Publication Data
US 2018/0312128 A1    Nov. 1, 2018

(30) Foreign Application Priority Data

Oct. 23, 2014 (DE) .................. 20 2014 008 432 U

(51) Int. Cl.
*B60R 21/217* (2011.01)
*B60R 21/203* (2006.01)
(Continued)

(52) U.S. Cl.
CPC ........ *B60R 21/217* (2013.01); *B60R 21/2037* (2013.01); *B60R 21/26* (2013.01);
(Continued)

(58) Field of Classification Search
CPC .... B60R 2021/2173; B60R 2021/2175; B60R 21/217; B60R 21/2037; B60R 21/26; B60R 21/261; B60R 21/272; B60R 2021/2725
See application file for complete search history.

(56) References Cited

U.S. PATENT DOCUMENTS 3,037,150 A * 5/1962 Schriner .................. H02K 5/24
361/220
5,141,247 A * 8/1992 Barth .................... B60R 21/217
280/728.2

(Continued)

FOREIGN PATENT DOCUMENTS

CN    103192788 A  *  7/2013
DE    20305150        7/2003
(Continued)

*Primary Examiner* — Laura Freedman
(74) *Attorney, Agent, or Firm* — Tarolli, Sundheim, Covell & Tummino LLP

(57) ABSTRACT

The invention relates to an apparatus (10) for fastening a gas generator (11) in an oscillatory manner as a vibration damping mass inside an airbag module. A fastening ring (12) provided for fastening the gas generator (11) has at least one elastic section (14) and at least one reinforcement insert (15) for reinforcing the fastening ring (12) and securing the fastening ring (12) to the gas generator. A surface of the reinforcement insert (15) is made at least in part of plastic.

31 Claims, 5 Drawing Sheets

(51) Int. Cl.
  *B60R 21/261* (2011.01)
  *B60R 21/26* (2011.01)
  *B60R 21/272* (2006.01)

(52) U.S. Cl.
  CPC .......... *B60R 21/261* (2013.01); *B60R 21/272* (2013.01); *B60R 2021/2173* (2013.01); *B60R 2021/2725* (2013.01)

(56) References Cited

U.S. PATENT DOCUMENTS

| | | | | |
|---|---|---|---|---|
| 5,382,046 A * | 1/1995 | Cuevas | ............... | B60R 21/2035 280/728.2 |
| 6,464,247 B1 * | 10/2002 | Laue | ................... | B60R 21/2037 280/728.2 |
| 6,679,518 B2 * | 1/2004 | Varcus | ................ | B60R 21/2037 280/728.2 |
| 6,712,383 B2 * | 3/2004 | Asic | .................... | B60R 21/2037 280/728.2 |
| 6,814,369 B2 * | 11/2004 | Heindl | ................ | B60R 21/2037 280/728.2 |
| 7,350,800 B2 * | 4/2008 | Boyd | .................. | B60R 21/217 280/728.2 |
| 7,494,150 B2 * | 2/2009 | Boyd | ................. | B60R 21/2037 280/728.2 |
| 7,641,219 B2 * | 1/2010 | Wagener | ............. | B60R 21/2171 24/484 |
| 8,641,089 B2 * | 2/2014 | Friedrich | .............. | B60R 21/203 280/731 |
| 8,827,306 B2 * | 9/2014 | Iida | ..................... | B60R 21/2035 280/728.2 |
| 2002/0140210 A1 | 10/2002 | Lovell et al. | | |
| 2003/0038459 A1 | 2/2003 | Leibach et al. | | |
| 2003/0214119 A1 | 11/2003 | Grossmann et al. | | |
| 2004/0041373 A1 * | 3/2004 | Helmstetter | .......... | B60R 21/217 280/728.2 |
| 2006/0061068 A1 * | 3/2006 | Nash | ................... | B60R 21/2037 280/728.2 |
| 2006/0220353 A1 | 10/2006 | Boyd et al. | | |
| 2008/0136073 A1 | 6/2008 | Kreuzer | | |
| 2012/0139212 A1 | 6/2012 | Staudt | | |
| 2017/0313275 A1 * | 11/2017 | Eck | ..................... | B60R 21/2037 |
| 2017/0369021 A1 * | 12/2017 | Kienzner | ............ | B60R 21/2037 |

FOREIGN PATENT DOCUMENTS

| | | |
|---|---|---|
| DE | 102007049234 | 4/2009 |
| DE | 102008036272 | 2/2010 |
| EP | 102012101396 | 5/2013 |
| JP | 2006096217 A * | 4/2006 |

* cited by examiner

APPARATUS FOR FASTENING A GAS GENERATOR IN AN OSCILLATORY MANNER AS A VIBRATION DAMPING MASS INSIDE AN AIRBAG MODULE

RELATED APPLICATIONS

This application corresponds to PCT/EP2015/001989 filed Oct. 9, 2015, which claims the benefit of German Application No. 20 2014 008 432.7 filed Oct. 23, 2014, the subject matter of which are incorporated herein by reference in their entirety.

BACKGROUND OF THE INVENTION

The invention relates to an apparatus for fastening a gas generator in an oscillatory manner as a vibration damping mass inside an airbag module, to an airbag module, to a vehicle occupant safety system, to a method of manufacturing an apparatus for fastening a gas generator in an oscillatory manner as a vibration damping mass inside an airbag module as well as to a method of manufacturing an airbag module.

Apparatuses for fastening a gas generator in an oscillatory manner as a vibration damping mass inside an airbag module are known in which a fastening ring is provided which at the same time serves as a vibration absorber. Usually fastening rings of this type consist of a metal ring being insert-molded in silicone and crimped to the generator flange. Such solution is known, for example, from DE 10 2009 030 601 A1. Concretely, in DE 10 2009 030 601 A1 an annular reinforcement insert ("retaining member") is described which includes axially projecting extensions in the form of bent tongues which are embedded in a stop lip. The stop lip comprises plural circular segments made from silicone and arranged along the periphery of the retaining member. Further, fastening feet made from elastic material and being fastened to a generator support are injection-molded to the retaining member. Alternatively, in DE 10 2009 030 601 A1 it is also suggested for the stop lip to be integrally transformed into the respective fastening foot and thus to be integrally circumferential in a closed manner (i.e. equally forms a ring in which the retaining member is received).

It is a problem in this context that for safe adhesion of the elastic material (especially silicone) to the metal ring the latter has to be intricately cleaned and kept clean until over-molding. This is related with rather high expenses. Furthermore, the effort for manufacturing the fastening ring and for mounting an appropriate airbag module including such fastening ring is considered to be in need of improvement.

SUMMARY OF THE INVENTION

It is the object of the present invention to suggest an apparatus for fastening a gas generator in an oscillatory manner as a vibration damping mass inside an airbag module which overcomes the afore-mentioned drawbacks. Especially, it is intended to suggest an apparatus for fastening a gas generator in an oscillatory manner as a vibration damping mass which can be manufactured in a simple and cost-efficient way. Furthermore, an airbag module which can be manufactured and mounted at low cost with comparatively little effort is to be suggested. Further a corresponding vehicle occupant safety system is to be suggested. Finally, a method of manufacturing an apparatus for fastening a gas generator in an oscillatory manner as a vibration damping mass inside an airbag module as well as a method of manufacturing an airbag module are to be suggested, wherein manufacture is to be enabled in a simple manner and at comparatively low cost.

According to the invention, this object is achieved with respect to the apparatus for fastening in an oscillatory manner by the subject matters of the claims 1 to 3, with respect to the airbag module by the subject matter according to claim 18, with respect to the vehicle occupant safety system by the subject matter according to claim 24, with respect to the method of manufacturing an apparatus for fastening a gas generator in an oscillatory manner by the subject matters according to the claims 25 and 26 as well as with respect to the method of manufacturing an airbag module by the subject matter according to claim 27.

In accordance with a first aspect, the foregoing object is achieved by an apparatus for fastening a gas generator in an oscillatory manner as a vibration damping mass inside an airbag module, wherein a fastening ring is provided for fastening the gas generator, the gas generator including at least one elastic section and a reinforcement insert for reinforcing the fastening ring and securing the fastening ring to the gas generator, wherein the reinforcement insert is made at least in part from plastic material. A first embodiment provides a reinforcement insert having a metal core which is coated (at least in portions), especially over-molded, with plastic. In a second embodiment, a reinforcement insert is suggested which is completely made from (possibly fiber-reinforced) plastic. In each case a surface of the reinforcement insert is made at least in part from plastic. In this way, intricate cleaning of the surface of the metal part may be omitted, as the elastic section adheres comparatively tightly to the plastic surface. Especially, the entire surface of the reinforcement insert or at least the entire surface of the reinforcement insert which is in (direct) contact with the elastic section is made from plastic. For securing the fastening ring to the gas generator the latter may include fastening means (being integrally formed, if necessary), such as plastically deformable sections (for realizing a crimped connection, for example) or detent means for realizing a detent connection or snap connection.

In accordance with a second aspect (which may be combined with the first aspect, where appropriate), the foregoing object is achieved especially by an apparatus for fastening a gas generator in an oscillatory manner as a vibration damping mass inside an airbag module, wherein a fastening ring is provided for fastening the gas generator, the fastening ring including at least one elastic section and a reinforcement insert for reinforcing the fastening ring and securing the fastening ring to the gas generator, wherein the reinforcement insert is formed by an open reinforcing ring and the elastic section is formed by a closed ring in which the reinforcement insert is received. A central idea of the second aspect resides in forming an open reinforcing ring which interacts with an elastic closed ring. In this way, advantageously the fact is exploited that the elastic section can be utilized for stabilizing the basically open reinforcing ring. By the open design of the reinforcing ring it can be mounted in a comparatively simple manner on a flange of the gas generator. Further components for fastening the fastening ring may be omitted. In total, assembly is facilitated. Moreover, the interaction of the elastic section and the open reinforcing ring also improves adhesion between said two elements so that intricate cleaning of the reinforcing ring, if the latter is made from metal, can be omitted or at least carried out with less effort.

By "plastic" especially polymeric materials are to be understood, such as polyolefin, preferably polyethylene and/or polypropylene and/or polyamide and/or polyvinylchloride and/or polystyrene and/or polyurethane and/or polyethylene terephthalate. The listed plastic materials may be fiber-reinforced, for example by carbon fiber and/or glass fiber. An E-modulus of the plastic preferably is at least 2 GPa, preferably at least 5 GPa, further preferred at least 10 GPa, still further preferred at least 50 GPa. An elastic section preferably is made from a material whose E-modulus is less than 1 GPa, preferably less than 0.5 GPa, further preferred less than 0.1 GPa. Should the elastic section be fabricated of plural materials, if is preferred that the material having the highest E-modulus is below the afore-mentioned values. For example, the elastic section may be formed of an elastomer, especially silicone and/or rubber, or may comprise such materials.

According to a third aspect, the foregoing object is achieved by an apparatus for fastening a gas generator in an oscillatory manner as a vibration damper mass inside an airbag module, wherein a fastening ring is provided for fastening the gas generator, the fastening ring having at least one elastic section and one reinforcement insert for reinforcing the fastening ring and securing the fastening ring to the gas generator, wherein the reinforcement insert at least in portions encompasses the elastic section such that the elastic section can be retained on the gas generator. The third aspect may be combined with the first aspect and/or the second aspect. A central idea of the third aspect resides in providing a reinforcing member which does not only serve for reinforcing the fastening ring and, where necessary, for fastening to a flange of the gas generator, but at the same time is also arranged so that the elastic section is retained on the gas generator (and, resp., between the reinforcing member and the gas generator). The reinforcing member may be made from metal or plastic (or may comprise said materials). In each case an improved support of the elastic section is obtained so that cleaning of the reinforcing member may be dispensed with or at least is linked with less effort. The reinforcing member may be provided as a separate component which is joined with the elastic section and the gas generator so that the elastic section is retained between the reinforcing member and the gas generator. The reinforcing member can be folded (after inserting the gas generator) over the elastic section and the flange of the gas generator so as to safely retain the gas generator and the elastic section. Optionally, the reinforcing member may be coated, especially over-molded, with plastic (and/or include a metal core). Further, the reinforcing member can be formed as an open ring which is designed, where appropriate, so as to be placed around the flange of the gas generator (especially with the already arranged elastic section) so that crimping of metal portions may possibly be dispensed with (at least when appropriate retaining projections are provided on the reinforcing member). Open ring ends may be connected by gluing or by latching or by an additional component (such as a rivet or screw).

The afore-mentioned reinforcing ring may be made from metal and/or plastic.

The reinforcement insert and/or the reinforcing member and/or the reinforcing ring may include a metal core which at least in portions is coated, especially over-molded, with plastic. The reinforcement insert and/or the reinforcing member and/or the reinforcing ring may be made from metal and/or plastic, especially fiber-reinforced plastic.

The reinforcement insert and/or the reinforcing member and/or the reinforcing ring may include at least one fastening portion which is plastically deformable for fastening the fastening ring to the gas generator, especially to a flange of the gas generator. The fastening portion may be an (annular or peripheral, where appropriate) rim of the respective component. Preferably the fastening portion is a fastening lug which can be bent (especially for forming a crimped connection). For example, such fastening lug may be laid around a flange of the gas generator and/or may be passed through a slit of the flange of the gas generator. After inserting the gas generator individual sections of the respective component can be folded over the generator flange so as to safely retain the same. Such fastening portion allows for realizing simple fastening and, resp., assembly of the gas generator.

In a concrete embodiment, an (additional) annular disk (especially made from metal and/or plastic, coated, preferably over-molded, with plastic, where necessary) is provided which can be placed onto the generator flange. The annular disk may be fastened especially (along with the flange of the gas generator, if appropriate) by folding fastening portions of the reinforcement insert (optionally over-molded with plastic). Basically, the annular disk may act as an additional weight. Thus, the vibration damping mass is increased by simple measures, wherein the fastening of the gas generator on the fastening ring is synergistically utilized for simultaneously fastening the additional weight. In total, the efficiency of the apparatus is increased while the assembly is simple. The annular disk may have a weight of at least 100 g.

The reinforcement insert and/or the reinforcing member and/or the reinforcing ring may include a detent means for engaging the fastening ring in the gas generator, especially in a flange of the gas generator. The fastening ring may be clipped to the flange of the gas generator, for example, and can optionally be detachably (or permanently) secured to the same. Concretely, the detent means may have at least one detent tongue including a projection which may be passed by the flange of the gas generator such that a rim of the flange engages behind the projection. In this alternative, it is especially preferred to (optionally completely) design the reinforcing member and/or the reinforcement insert and/or the reinforcing ring of fiber-reinforced plastic.

The fastening ring may be fastened detachably, preferably via a screwed connection, or permanently, preferably via a riveted connection, to the gas generator, especially to a flange of the gas generator.

The reinforcing member may (at least partially) be formed by an open ring which may be placed on the gas generator, especially on the flange of the gas generator, for securing the fastening ring. The (open) ring preferably includes at least one retaining projection which can be laid over the flange of the gas generator. Preferably, the reinforcing member is a separate component which can be laid around the flange of the gas generator (with an elastic section already being arranged on the latter) so that crimping of fastening portions may optionally be dispensed with. Ends of the open ring may preferably be closable (after arranging the ring on the gas generator, especially on the flange of the gas generator), especially by an adhesive and/or non-positive and/or positive connection. For example, a detent connection and/or bonded connection and/or welded connection and/or screwed connection and/or riveted connection may be provided. Connecting elements may be an integral component of the (open) ring or may be provided as separate elements. Especially preferred, such reinforcing member is made from plastic. In total, easy assembly of the fastening ring is enabled without requiring any plastic reforming and especially without requiring any metal parts.

When the reinforcement insert is formed by an (open) reinforcing ring, the latter is preferably held together by the elastic section. Especially the elastic section is tensioned by a resetting force of the (open) reinforcing ring, in particular such that a retaining force (static friction force) between the open reinforcing ring and the elastic section is increased. In this way, improved support of the elastic section on the reinforcement insert can be easily obtained. In total, the mounting and manufacturing expenditure is reduced.

The reinforcement insert and/or the reinforcing member and/or the reinforcing ring and/or the annular disk may be formed of a material having an E-modulus of at least 5 GPA, preferably at least 10 GPa, further preferred at least 100 GPa.

The elastic section may be made from an elastomer, especially a rubber material (caoutchouc) or silicone. An E-modulus of the material of the elastic section may be less than 1 GPa, preferably less than 0.5 GPa, further preferred less than 0.1 GPa.

At least one (preferably at least plural) axially extending damping members, especially absorbing feet, may be provided. The fastening ring may have a radially extending annular gap. Said annular gap may be bridged e.g. via a connecting means (integrally formed with the fastening ring), such as a clip connection which optionally comprises a pin, so that the fastening ring can be closed. Where appropriate, ends of the fastening ring may be connected (in the mounted state) also by the fact that projections provided at the ends are passed through an opening of the gas generator, especially of the flange of the gas generator, and are held together by said opening.

The foregoing object is further achieved by an airbag module comprising a gas generator, especially including a flange, as well as comprising an apparatus for fastening a gas generator in an oscillatory manner as a vibration damping mass inside the airbag module. The apparatus for fastening in an oscillatory manner is designed as afore-described. The airbag module may further include an airbag and/or a diffuser and/or a module support. The elastic section and/or the reinforcement insert and/or the reinforcing member may be in direct contact with the gas generator, especially the flange of the gas generator.

The flange of the gas generator is preferably ring-shaped and may be circumferential about an outer wall of the gas generator. Alternatively or additionally, the flange of the gas generator is formed integrally with a (the) outer wall of the gas generator. In a concrete embodiment, the flange extends outwardly from an outer wall of the gas generator and includes at least one bent portion which connects a straight portion of the flange to the outer wall, where necessary.

The elastic section may be arranged between the reinforcing member and the gas generator, especially between the reinforcing member and the flange of the gas generator. When a reinforcement insert is provided, it may be arranged between the elastic section and the gas generator, especially between the elastic section and the flange of the gas generator.

The fastening ring and the gas generator, especially the fastening ring and the flange of the gas generator, may be secured to each other by adhesive and/or force and/or form closure, for example via a crimped and/or screwed and/or riveted and/or detent and/or snap connection.

The foregoing object is further achieved by a vehicle occupant safety system comprising an airbag module of the afore-described type. Moreover, a housing receiving an airbag module, especially a steering wheel housing may be provided.

The foregoing object is further achieved by a method of manufacturing an apparatus for fastening a gas generator in an oscillatory manner as a vibration damper mass inside an airbag module, the apparatus including a fastening ring for fastening the gas generator, wherein the fastening ring includes at least one elastic section and one reinforcement insert for reinforcing the fastening ring and securing the fastening ring to the gas generator, comprising the following steps of:

coating, especially over-molding, a reinforcement insert with plastic material and applying the elastic section to the plastic material.

The method is preferably used for manufacturing an apparatus for fastening in an oscillatory manner of the afore-described type and, resp., for manufacturing an airbag module of the afore-described type. As far as functional features have been described in the foregoing in connection with the apparatus for fastening a gas generator in an oscillatory manner and with the airbag module, said functional features are intended to optionally further develop the method of manufacturing an apparatus for fastening in an oscillatory manner also in terms of the method. This shall also apply to the following aspects of the method.

According to another aspect of the invention, the foregoing object is achieved by a method of manufacturing an apparatus for fastening a gas generator in an oscillatory manner as a vibration damper mass inside an airbag module, wherein the apparatus is designed for fastening in an oscillatory manner preferably as afore-described and/or the airbag module is designed preferably as afore-described, the apparatus including a fastening ring for fastening the gas generator, wherein the fastening ring includes at least one elastic section and one reinforcement insert for reinforcing and securing the fastening ring to the gas generator, wherein the reinforcement insert is formed by an open reinforcing ring and the elastic section is formed by a closed ring in which the reinforcement insert is received, wherein the elastic section is applied to the reinforcement insert such that the latter is held together by elasticity of the elastic section. In such method, the elastic characteristic of the elastic section is efficiently utilized for stabilization and facilitated assembly of the fastening ring. In this way, the costs are reduced and the assembly is facilitated.

In accordance with another aspect of the method, the foregoing object is achieved by a method of manufacturing an airbag module (especially according to the afore-described type) comprising a gas generator, an apparatus for fastening a gas generator in an oscillatory manner as a vibration damping mass inside an airbag module, the apparatus being especially designed according to the afore-described type, the apparatus including a fastening ring for fastening the gas generator, the fastening ring including at least one elastic section and one reinforcing member for reinforcing the fastening ring and securing the fastening ring to the gas generator, comprising the steps of:

a) arranging the elastic section on the gas generator, especially on a flange of the gas generator, b) joining the reinforcing member to the elastic section and the gas generator, and c) fastening the reinforcing member to the gas generator, especially to the flange of the gas generator.

Preferably, step b) is carried out after step a). The reinforcing member (at first) may be provided as a separate component which is joined with the elastic section and the gas generator.

In total, such manufacturing method is capable of realizing safe retaining of the gas generator, although adhesion between the elastic section and the reinforcing member is not particularly strong (e.g. because cleaning of the reinforcing member is dispensed with).

BRIEF DESCRIPTION OF THE DRAWINGS

Hereinafter the invention shall be illustrated in detail by way of embodiments with reference to the enclosed schematic Figures, wherein.

In the following description like reference numerals are used for like and equally acting parts.

DESCRIPTION

Figure 1:
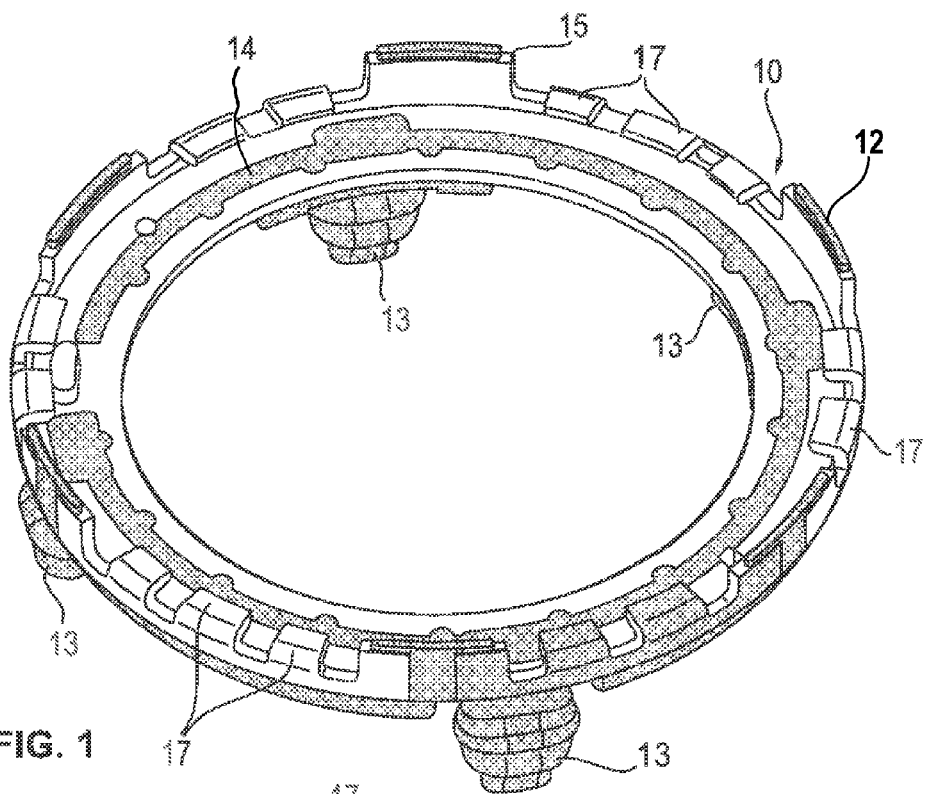
FIG. 1: shows a schematic oblique view of a first embodiment of an apparatus for fastening a gas generator in an oscillatory manner.
Figure 2:
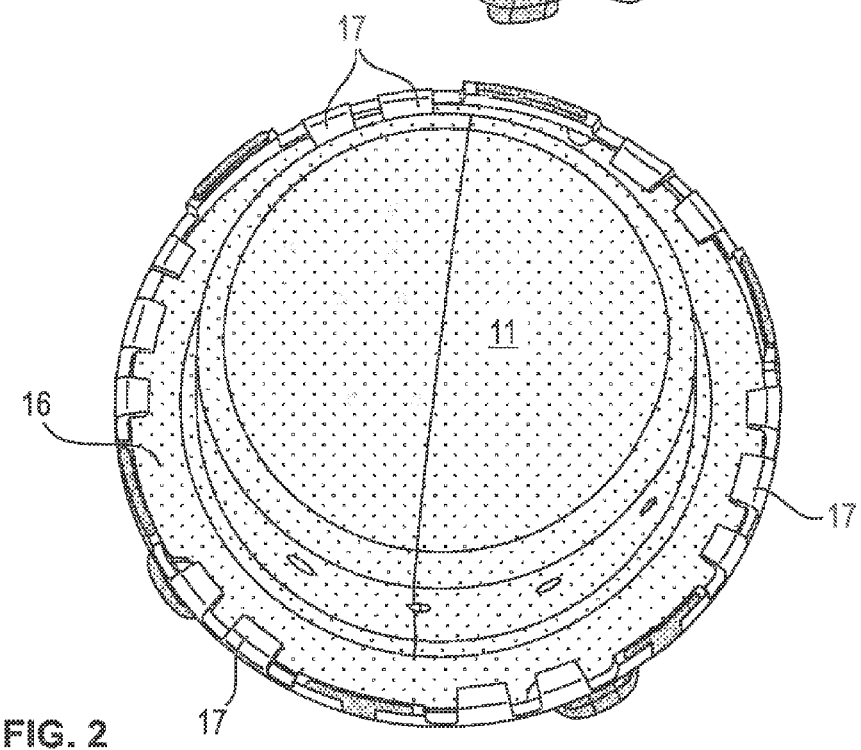
FIG. 2: shows a schematic oblique view of the apparatus according to FIG. 1 along with a gas generator.

FIG. 1 illustrates an oblique view of a first embodiment of an apparatus 10 for fastening a gas generator 11 in an oscillatory manner (cf. FIG. 2) as a vibration damping mass inside an airbag module. FIG. 2 shows an oblique view of the gas generator 11 with the gas generator 11 being mounted thereon. The apparatus 10 includes a fastening ring 12 having axially extending damping members (absorbing feet) 13. Further, the fastening ring 12 comprises elastic sections, especially made from silicone (shown in violet or in a uniform color/gray shade) and a reinforcement insert 15 (shown in olive green or in a uniform color/gray shade). The reinforcement insert 15 reinforces the elastic sections 14 and serves for securing the fastening ring 12 to a flange 16 of the gas generator 11 (cf. FIG. 2).

For this purpose, the reinforcement insert 15 has plural plastically deformable lugs 17 which can be laid around the flange 16 of the gas generator 11 so that the fastening ring 12 is retained on the gas generator 11.

The reinforcement insert 15 according to FIGS. 1 and 2 is designed as a metal part over-molded with plastic.

The absorbing feet 13 are fastened to a generator support (not shown) in a mounted state of an airbag module.

Optionally, an annular metal disk (not shown) (which can but need not be over-molded) can be placed onto the flange 16. The metal disk then can be fastened together with the flange of the gas generator by folding the lugs 16 and can act as an additional weight.

Figure 3:
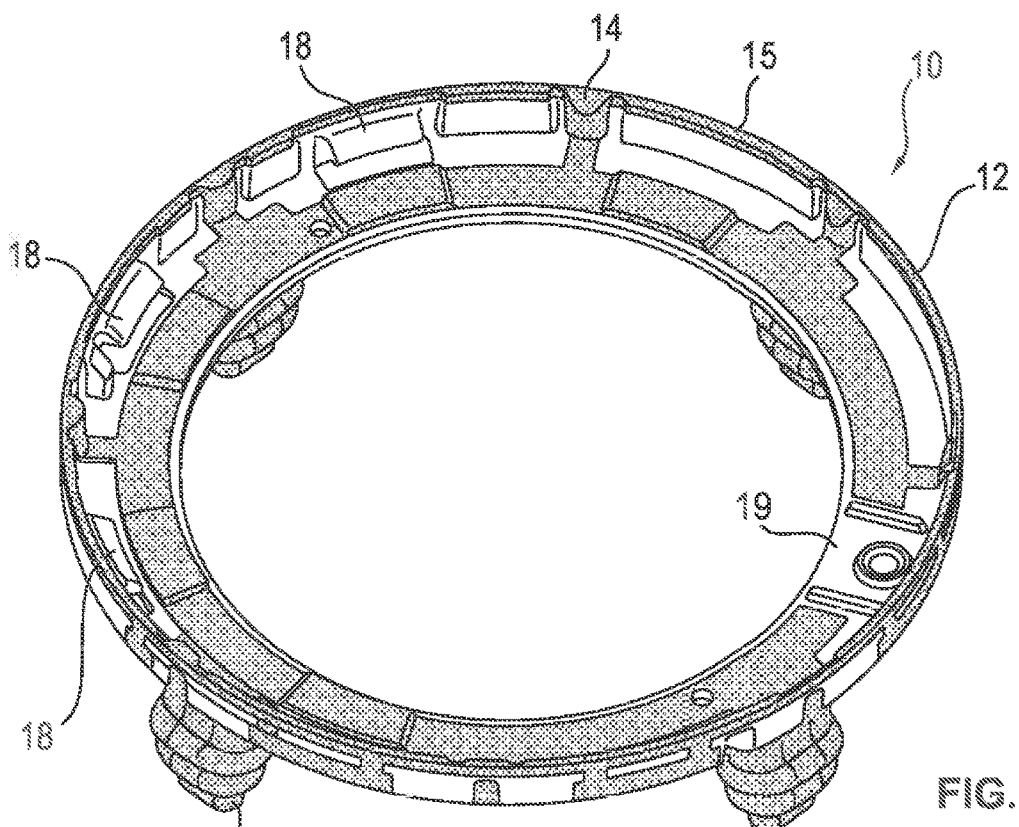
FIG. 3: shows a schematic oblique view of another embodiment of an apparatus for fastening a gas generator in an oscillatory manner.

FIG. 3 illustrates another embodiment of the apparatus 10 including a fastening ring 12. The fastening ring 12 has (analogously to FIG. 1) elastic sections 14 (violet or in uniform color/gray shade) as well as a reinforcement insert 15 (olive green or in uniform color/gray shade). In contrast to the embodiment according to FIG. 1, the embodiment according to FIG. 3 includes no lugs but clips 18 which can be clipped over the flange of the gas generator 11 (which may be designed as shown in FIG. 2). In this way, the reinforcing ring 12 is secured to the flange 16 of the gas generator 11. The reinforcement insert 15 is formed (analogously to FIG. 1) of a metal part over-molded with plastic, but it may as well be formed completely of (optionally fiber-reinforced) plastic material. Optionally, the fastening ring 12 according to FIG. 3 may further be secured to the flange 16 of the gas generator 11 by a screwed connection. For this, a screw seat 19 is provided. Alternatively, the embodiment according to FIG. 3 may be adapted so that (equally optionally) an additional riveted connection is provided between the flange 16 and the fastening ring 12.

Figure 4:
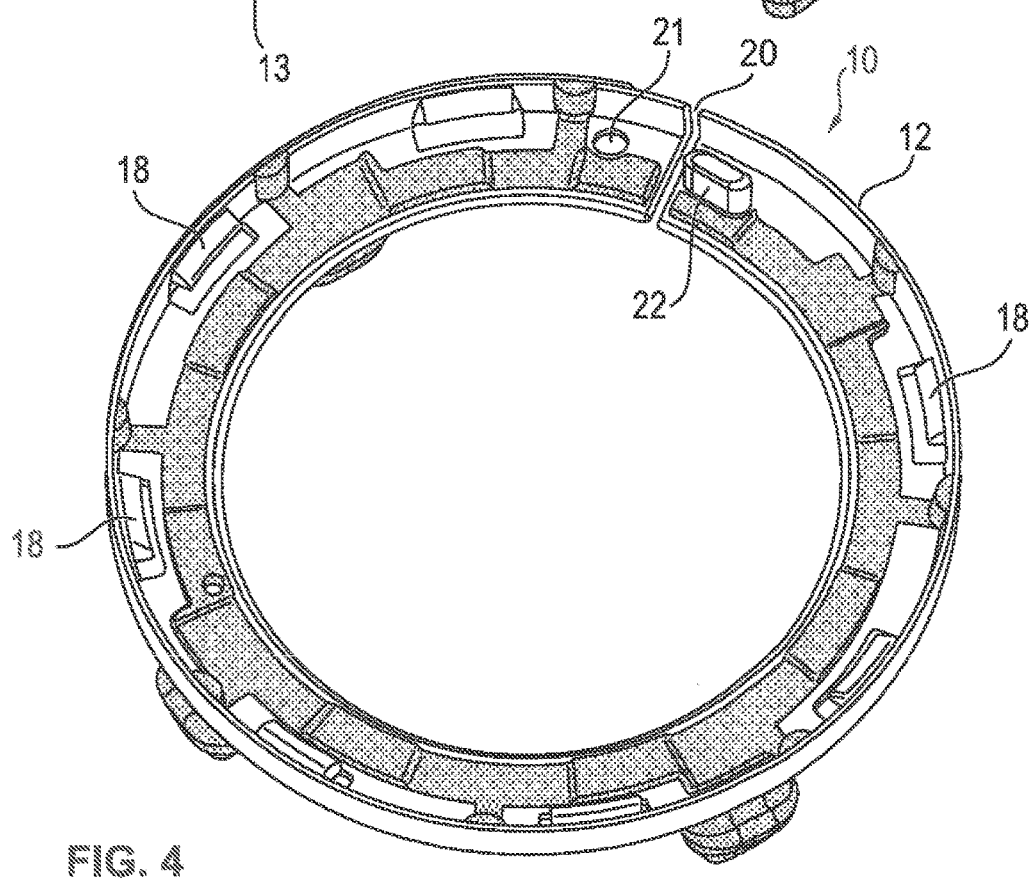
FIG. 4: shows a schematic oblique view of another embodiment of an apparatus for fastening a gas generator in an oscillatory manner.

FIG. 4 illustrates an apparatus 10 comprising a fastening ring 12 including (analogously to FIG. 3) clips 18 for engaging (as described in connection with FIG. 3) in the flange 16 of the gas generator 11 (which may be designed according to FIG. 2). In contrast to FIGS. 3 and 1 (showing gapless embodiments of the fastening ring 12), the fastening ring 12 according to FIG. 4 includes a gap 20 adapted to be (slightly) opened during mounting so that the fastening ring 12 can be clipped onto the flange 16 with less effort. It might also be imaginable that the clips 18 are provided merely as (rigid) projections, with mounting between the fastening ring 12 and the flange 16 being carried out by sufficiently opening the gap 20. With such alternative, the projections 18 would be merely securing projections which prevent the fastening ring 12 from detaching from the flange 16. Further, the embodiment according to FIG. 4 is designed for a (permanent) riveted connection and for this purpose has an opening 21. Via the opening 21 the fastening ring 12 can be connected to the flange 16. Moreover, a positioning nipple 22 is provided which can be passed through an opening of the flange 16 of the gas generator 11. By interaction between a riveted connection and the positioning nipple 22 received in the opening the slotted fastening ring 12 can be stabilized after mounting so that the gap cannot open any more.

In FIG. 4 the riveted connection may also be replaced with a screwed connection. In a simpler configuration, the riveted connection might also be omitted. It would be imaginable, for example, that the positioning nipple 22 is split such that a first half is arranged on the one slit side and a second half is arranged on the other slit side so that the total positioning nipple could be held together by an opening inside the flange 16 of the gas generator, which in turn would prevent the gap from opening again after mounting.

Just as in FIG. 3, in FIG. 4 the metal insert is formed of over-molded metal (olive green or uniform color/gray shade) and the elastic sections are formed of silicone (violet or uniform color/gray shade). The over-molded reinforcement insert could as well be made completely from (optionally fiber-reinforced) plastic material.

Figure 5:
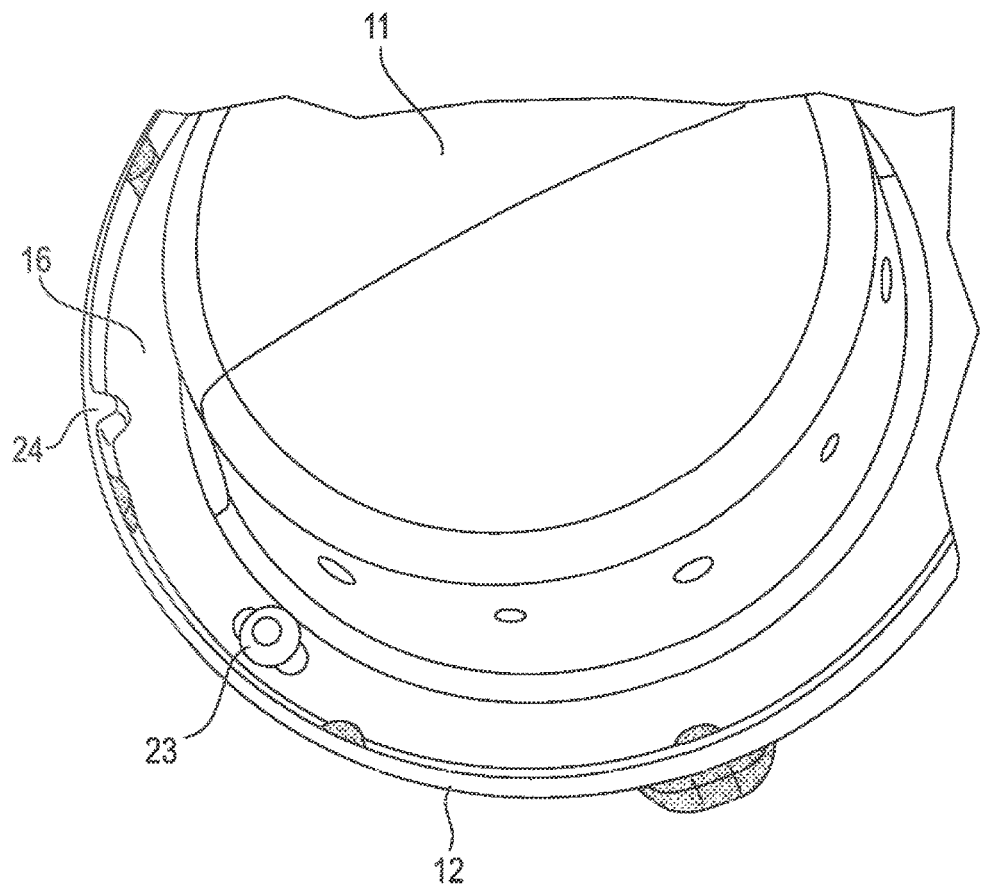
FIG. 5: shows a cutout from a schematic oblique view of a gas generator comprising an apparatus for fastening a gas generator in an oscillatory manner.

FIG. 5 illustrates a cutout of another embodiment of a connecting structure between the gas generator 11 and, resp., the flange 16 thereof and the fastening ring 12. Especially a screwed connection 23 is provided for securing the flange 16 to the fastening ring 12 and, resp., the reinforcement insert thereof. Further, the fastening ring is additionally secured by at least one securing projection 24.

Figure 6:
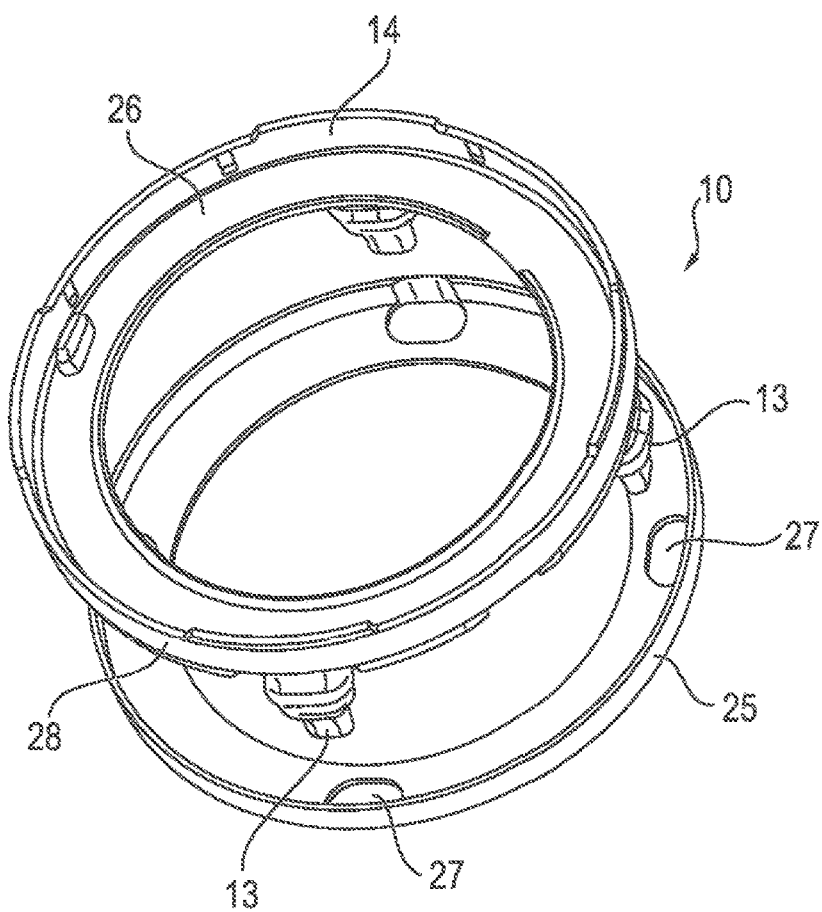
FIG. 6: shows a schematic exploded view of another embodiment of an apparatus for fastening a gas generator in an oscillatory manner.

FIG. 6 illustrates an exploded view of a further embodiment of the apparatus 10. The elastic sections 14 are formed in this case by an annular elastic element 26 including absorbing feet 13 (the elastic sections 14 of the other embodiments may be formed by an elastic annular element 26, too). Further, a reinforcing member 25 (being equally ring-shaped) is provided which includes openings 27 for receiving the absorbing feet 13. For mounting the apparatus 10 on the gas generator the elastic element 26 is arranged on the flange of the gas generator. Then the reinforcing member 25 is joined with the elastic element 26 so that the reinforcing member 25 encompasses a peripheral area 28 of the elastic element 26. The absorbing feet 13 are received in the openings 27. After joining the reinforcing member 25 (individual) sections of the reinforcing member 25 may be folded over the elastic element 26 and the flange of the gas generator so that the gas generator is safely retained. In the embodiment of FIG. 6, the reinforcing member 25 preferably is a reinforcing member made from metal, especially over-molded with plastic material.

Figure 7:
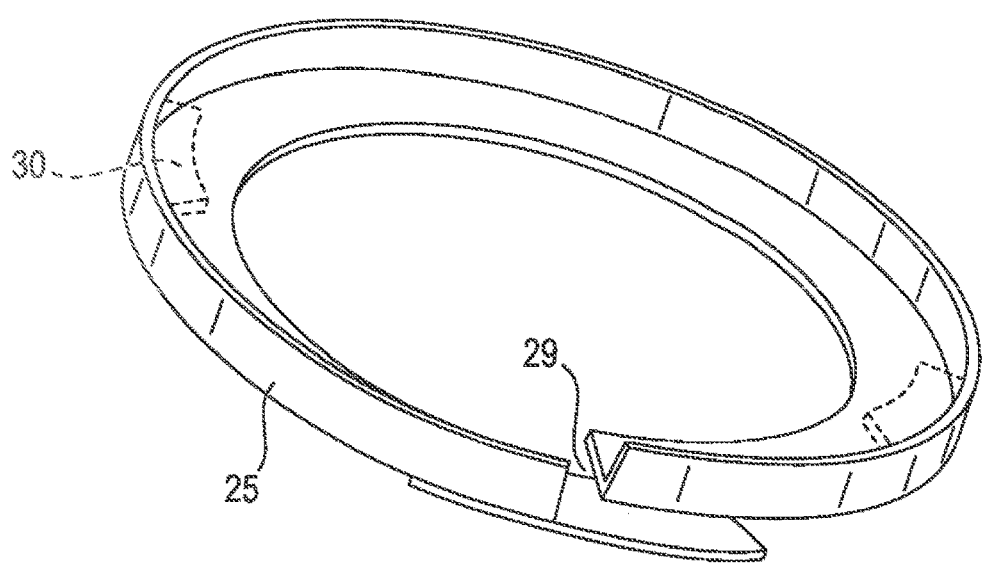
FIG. 7: shows a schematic oblique view of another embodiment of an apparatus for fastening a gas generator in an oscillatory manner.

FIG. 7 illustrates a schematic oblique view of another embodiment of the reinforcing member 25. Basically, the reinforcing member 25 according to FIG. 7 may be designed (with the following differences) just as the reinforcing member 25 according to FIG. 6 (it may include openings 27, for example). In contrast to the embodiment of FIG. 6 in which the reinforcing member 25 has a continuous design, the embodiment according to FIG. 7 includes a gap 29 and, resp., is designed as an open ring. Said open ring may be laid around the flange of the gas generator (with the elastic element being already arranged thereon), wherein it is not necessary to fold (especially to crimp) sections for securing. A support can be realized by retaining projections 30 one of which is exemplified (shown in broken lines) in FIG. 7. In the embodiment according to FIG. 7, the reinforcing member 25 may be a reinforcing member made from metal or plastic. Open ring ends may be formed by gluing or by engaging or else by an additional component (such as a screw or rivet).

Figure 8:
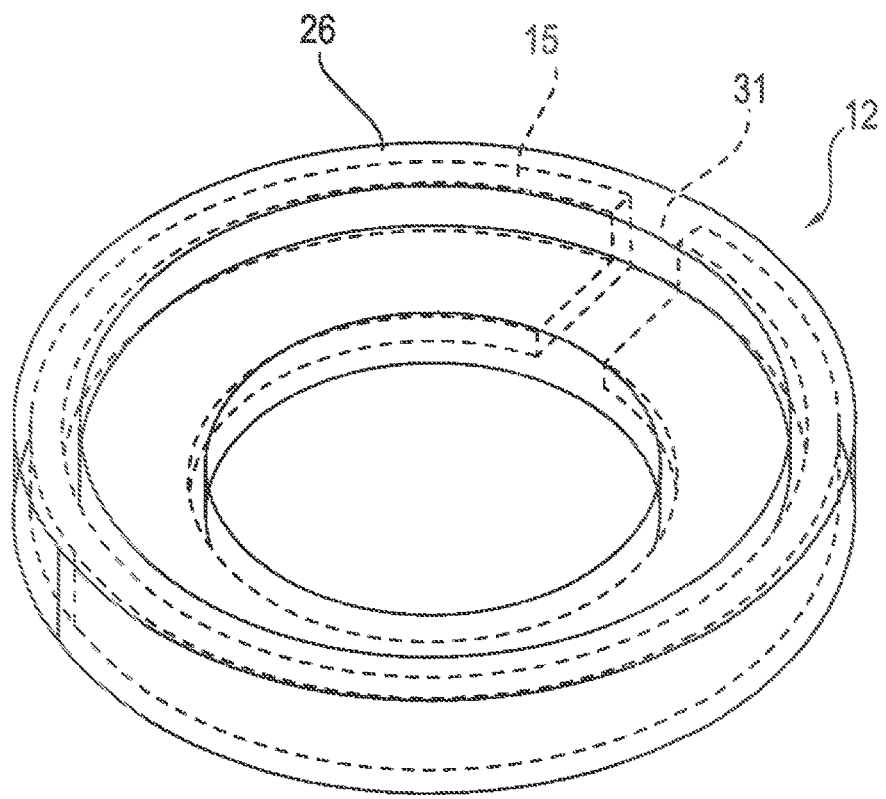
FIG. 8: shows a schematic oblique view of another embodiment of an apparatus for fastening a gas generator in an oscillatory manner.

FIG. 8 shows a schematic oblique view of a further embodiment of the fastening ring 12 (further components such as especially absorbing feet may be provided). In the embodiment of FIG. 8, an annular continuous elastic element 26 is provided in which an annular reinforcement insert 15 is arranged. The annular reinforcement insert 15 has an open design, however. The reinforcing member 15 may be made from metal or plastic. The fastening to the flange of the gas generator may be as described in the other embodiments (e.g. lugs or clips which are not shown may be provided for this purpose).

During assembly, a gap 31 of the reinforcement insert 15 may be further opened, wherein the elastic element 26 will expand due to its elasticity. A flange of the gas generator then may be received by retaining elements (not shown in detail) of the reinforcement insert 15. As soon as the reinforcement insert 15 and the flange are secured to each other, the elastic element 26 constricts the reinforcement insert 15 so that the latter is stabilized and the gas generator is safely retained.

LIST OF REFERENCE NUMERALS 10 apparatus
11 gas generator
12 fastening ring
13 damping member (absorbing foot)
14 elastic section
15 reinforcement insert
16 flange
17 lug
18 clip
19 screw seat
20 gap
21 opening
22 positioning nipple
23 screwed connection
24 securing projection
25 reinforcing member
26 elastic element
27 opening
29 gap
30 retaining projection
31 gap

The invention claimed is:

1. An apparatus (10) for fastening a gas generator (11) in an oscillatory manner as a vibration damping mass inside an airbag module, comprising a fastening ring (12) provided for fastening the gas generator (11) and being completely divided by a continuous, radially outward extending annular gap (20) so that the fastening ring (12) has a ring end on each side of the annular gap (20), the fastening ring (12) having at least one elastic section (14) and at least one reinforcement insert (15) for reinforcing the fastening ring (12) and securing the fastening ring (12) to the gas generator (11), the at least one elastic section (14) being separate from the at least one reinforcement insert (15),
wherein a surface of the at least one reinforcement insert (15) is made at least in part of plastic, the at least one elastic section (14) being adhered to the plastic part of the at least one reinforcement insert (15),
wherein when the fastening ring (12) is secured to the gas generator (11), the elastic section (14) and the reinforcement insert (15) are in direct contact with a flange (16) of the gas generator (11).

2. The apparatus (10) according to claim 1, wherein an additional ring disk is provided which can be placed onto the flange (16) of the gas generator (11).

3. The apparatus (10) according to claim 1, wherein the fastening ring (12) can be fastened detachably or permanently to the gas generator (11).

4. The apparatus (10) according to claim 1, wherein the elastic section is made from an elastomer.

5. The apparatus (10) according to claim 1, wherein an E-modulus of a material of the elastic section (14) is less than 1 GPa.

6. The apparatus (10) according to claim 1, further comprising one, three, or four axially extending damping members (13).

7. An airbag module comprising a gas generator (11) and an apparatus (10) for fastening a gas generator (11) in an oscillatory manner as a vibration damping mass inside the airbag module according to claim 1.

8. The airbag module according to claim 7, wherein the flange of the gas generator is annularly circumferential about an outer wall of the gas generator and/or is formed integrally with the outer wall of the gas generator.

9. The airbag module according to claim 7, wherein the reinforcement insert (15) is arranged between the elastic section (14) and the gas generator (11).

10. The airbag module according to claim 7, wherein the fastening ring (12) and the gas generator (11) are fastened to each other.

11. A vehicle occupant safety system comprising an airbag module according to claim 7, and a housing for receiving the airbag module.

12. A method of manufacturing the apparatus of claim 1, comprising the steps of:
coating the reinforcement insert (15) with plastic material and applying the elastic section (14) to the plastic material.

13. The method of claim 12, wherein the elastic section (14) is applied to the reinforcement insert so that the latter is held together by elasticity of the elastic section (14).

14. The apparatus (10) according to claim 1, wherein the reinforcement insert (15) has a metal core which is coated and/or over-molded, at least in portions with plastic.

15. The apparatus (10) according to claim 1, wherein the reinforcement insert (15) is made at least in part from metal and/or plastic, and/or fiber-reinforced plastic.

16. The apparatus (10) according to claim 1, wherein the reinforcement insert (15) includes at least one fastening portion, which is plastically deformable for fastening the fastening ring (12) to the gas generator (11).

17. The apparatus (10) according to claim 1, wherein the reinforcement insert (15) includes a detent means and/or a clip (18) for engaging the fastening ring in the gas generator (11).

18. The apparatus (10) according to claim 1, wherein the reinforcement insert (15) is formed of a material which has an E-modulus of at least 5 GPa.

19. An apparatus (10) for fastening a gas generator (11) in an oscillatory manner as a vibration damping mass inside an airbag module comprising a fastening ring (12) provided for fastening the gas generator (11), wherein the fastening ring (12) has at least one elastic section (14) and one reinforcement insert (15) for reinforcing the fastening ring (12) and securing the fastening ring (12) to the gas generator (11), and wherein the reinforcement insert (15) is formed by an open reinforcing ring (15) and the elastic section (14) is formed by a closed ring (26) in which the reinforcement insert (15) is received.

20. The apparatus (10) according to claim 19, wherein the open reinforcing ring is held together by the elastic section (14).

21. The apparatus (10) according to claim 19, wherein the elastic section (14) is tensioned by a resetting force of the open reinforcing ring (15) to increase a static friction force between the open reinforcing ring (15) and the elastic section (14).

22. An apparatus (10) for fastening a gas generator (11) in an oscillatory manner as a vibration damping mass inside an airbag module, comprising a fastening ring (12) provided for fastening the gas generator (11), the fastening ring (12) having
at least one elastic section (14), the at least one elastic section (14) being formed by an annular elastic element (26), and
one reinforcing member (25) for reinforcing the fastening ring (12) and being formed at least in part by an open ring which has at least one retaining projection (30) adapted to be laid onto the gas generator (11) for securing the fastening ring (12) to the gas generator (11), ends of the open ring being configured to be closed after arranging the open ring on the gas generator (11), the reinforcing member (25) being separate from the at least one elastic section (14), the reinforcing member (25) at least in portions circumferentially surrounding an outer peripheral area (28) of the annular elastic element (26) such that the elastic section (14) can be secured to the gas generator (11).

23. The apparatus (10) according to claim 22, wherein the reinforcing member (25) has a metal core which is coated and/or over-molded, at least in portions with plastic.

24. The apparatus (10) according to claim 22, wherein the reinforcing member (25) is made at least in part from metal and/or plastic, and/or fiber-reinforced plastic.

25. The apparatus (10) according to claim 22, wherein the reinforcing member (25) includes at least one fastening portion, which is plastically deformable for fastening the fastening ring (12) to the gas generator (11).

26. The apparatus (10) according to claim 22, wherein the reinforcing member (25) includes a detent means and/or a clip (18) for engaging the fastening ring in the gas generator (11).

27. The apparatus (10) according to claim 22, wherein the reinforcing member (25) is formed of a material which has an E-modulus of at least 5 GPa.

28. A method of manufacturing the apparatus of claim 22, comprising the steps of:
arranging the elastic section (14) on the gas generator (11),
joining the reinforcing member (25) with the elastic section (14) and the gas generator (11), and
fastening the reinforcing member (25) to the gas generator (11).

29. An airbag module comprising a gas generator (11) and an apparatus (10) for fastening a gas generator (11) in an oscillatory manner as a vibration damping mass inside the airbag module according to claim 22.

30. The airbag module according to claim 29, wherein the elastic section (14) and/or the reinforcing member (25) is/are in direct contact with a flange (16) of the gas generator (11).

31. The airbag module according to claim 29, wherein the elastic section (14) is arranged between the reinforcing member (25) and a flange (16) of the gas generator (11).

* * * * *